United States Patent [19]

Beglin et al.

[11] Patent Number: 5,727,181
[45] Date of Patent: Mar. 10, 1998

[54] ARRAY MANAGEMENT SYSTEM WITH VOLUME TRANSFORM FILTER

[75] Inventors: Thomas William Beglin; Kenneth Fairclough Day, III; Douglas William Dewey, all of Tucson, Ariz.

[73] Assignee: International Business Machines Corporation, Armonk, N.Y.

[21] Appl. No.: 602,566

[22] Filed: Feb. 14, 1996

[51] Int. Cl.$^6$ .................................................. G06F 12/02
[52] U.S. Cl. ........................ 395/441; 395/492; 395/442
[58] Field of Search .................................. 395/439, 440, 395/441, 182.04, 182.05, 442, 497.04, 492, 482, 412

[56] References Cited

U.S. PATENT DOCUMENTS

| | | | |
|---|---|---|---|
| 5,072,378 | 12/1991 | Manka | 395/575 |
| 5,088,081 | 2/1992 | Farr | 369/54 |
| 5,249,279 | 9/1993 | Schmenk et al. | 395/425 |
| 5,301,297 | 4/1994 | Menon et al. | 395/425 |
| 5,313,612 | 5/1994 | Satoh et al. | 395/425 |
| 5,333,277 | 7/1994 | Searls | 395/325 |
| 5,497,457 | 3/1996 | Ford | 395/182.04 |
| 5,519,844 | 5/1996 | Stallmo | 395/441 |
| 5,530,850 | 6/1996 | Ford et al. | 395/600 |
| 5,574,851 | 11/1996 | Rathunde | 395/182.05 |

OTHER PUBLICATIONS

The RAIDbook, "A Source Book for Disk Array Technology", Fourth Edition, published by the RAID Advisory Board, St. Peter, MN, Aug. 8, 1994.

A. L. Drapeau, et al., "Striped Tape Arrays", pp. 257–265, Proceedings Twelfth IEEE Symposium, Monterey, California, Apr. 1993.

J. H. Hartman, et al., "Zebra: A Striped Network File System", pp. 71–78, Proceedings of the USENIX File Systems Workshop, Ann Arbor, MI, May 1992.

*Primary Examiner*—Eddie P. Chan
*Assistant Examiner*—Hiep T. Nguyen
*Attorney, Agent, or Firm*—Baker, Maxham, Jester & Meador

[57] ABSTRACT

In an data storage system, a volume transform filter is employed in conjunction with a RAID array manager to maintain logical volumes entirely on corresponding physical data storage volumes while maintaining parity information on a dedicated parity storage volume. This is achieved by modifying data access commands received from a host such that forwarding the modified commands to the RAID array manager in effect "tricks" the RAID array manager into maintaining the logical volumes without striping. This system provides data allocation with standalone data and parity storage volumes, which are easily exportable for convenient use in data storage libraries.

25 Claims, 3 Drawing Sheets

ARRAY MANAGEMENT SYSTEM WITH VOLUME TRANSFORM FILTER

BACKGROUND OF THE INVENTION

1. Field of the Invention

The present invention relates to DASD array management systems. More particularly, the invention concerns a volume transform filter configured to operate a RAID array manager to store all data segments for a single volume together on the same DASD, and maintain parity segments for all volumes on a dedicated parity DASD.

2. Description of the Related Art

Many customers that value continuous data availability are turning to data storage systems employing Redundant Array of Independent Disk ("RAID") architecture. RAID is chiefly implemented with magnetic disk storage devices, often called Direct Access Storage Devices ("DASDs").

RAID systems offer a number of advantages. One such advantage, for example, is improved data access. Generally, RAID systems are capable of accessing data with improved speed because of their inherent parallelism. Another advantage of RAID systems is improved data availability or "reliability". One source of this improved data reliability is the use of parity. Certain types of RAID systems perform parity calculations based upon stored data and store the parity information to aid in reconstructing the stored data in the event of a disk failure or other data loss. Another reason for RAID's improved data reliability is the use of data striping. Instead of storing a block of data on a single DASD, RAID systems "stripe" the block across multiple DASDs. Thus, the entire block is not lost if one of the DASDs fails; only those segments of the block stored on that DASD are lost, and these may be recovered through parity reconstruction. For even greater reliability, some RAID systems even stripe the parity segments.

FIG. 1 illustrates the operation of RAID level 3 ("RAID-3"), which is one of the more popular RAID configurations. In the illustrated storage subsystem 100, there are five physical volumes 102–106, each of which may comprise a DASD having one or more magnetic recording disks, for example. The first four physical volumes 102–105 are used to store data, but the fifth physical volume 106 is dedicated for storing parity information. The physical volumes 102–106 contain a plurality of storage segments, such as storage tracks. In this example, storage segments located at like addresses in different DASDs make up a horizontal "stripe" of storage segments. A vertical row (as depicted) of storage segments represents a single physical volume. This arrangement may vary in actual implementation, however, by providing "logical" stripes that are made up of one storage segment from each physical volume, where the storage segments do not necessarily have the same addresses in all of the physical volumes.

Broadly, the RAID-3 mapping algorithm evenly stripes the segments of a block of data across all physical volumes but one, the dedicated parity volume 106. For each horizontal stripe of distributed data segments, parity information is stored in a horizontally corresponding segment of the parity volume 106.

In FIG. 1, the disk subsystem 100 is managed by a RAID-3 array manager 150 via an interface 125. The mapping algorithm of the array manager 150 enables the host 175 to view the disk subsystem 100 as a number of sequentially stored logical volumes. Therefore, data access commands from the host may identify a logical volume and a specific segment within that volume. In response, a data access command issued by the array manager 150 references the specified data segment with respect to a continuous ordered sequence of N storage locations winding through the physical volumes 102–106 (e.g. segment 1, segment 2, segment 3 . . . segment N).

As illustrated, the RAID-3 array manager 150 stores the first through fourth segments 108–111 in similarly-ordered storage segments of the physical volumes 102–105. The segments 108–111 constitute a "stripe" of data, upon which the parity segment 113 is computed. The stripe 108–113 may contain part of a logical volume, an entire logical volume, or multiple logical volumes maintained by the host, because the logical volumes of data are stored sequentially in the continuous string of segments, irrespective of the boundaries of the physical volumes 100.

For additional description of known RAID configurations, attention is directed to the following publication, which is incorporated by reference in its entirety: The RAIDbook: A Source Book for Disk Array Technology (4th Ed.), published by The RAID Advisory Board, St. Peter, Minn. (Aug. 8, 1994).

As mentioned above, RAID storage systems provide a number of valuable benefits. In this regard, RAID systems have been known to completely satisfy the requirements of many applications. Due to the widespread popularity of RAID systems, various software and electronic products have become commercially available to implement RAID functions. As a result of this popularity and competition among manufacturers, the quality and features of these products continually improve and their prices continually decrease.

Although many users may prefer RAID systems for certain applications due to the benefits discussed above, RAID systems are not particularly well suited to certain other types of applications. Due to RAID's striping of data, RAID does not work in applications having removable storage media, such as data storage libraries. In particular, RAID does not permit logical volumes to stand alone, since each logical volume's data segments are striped across multiple physical volumes (if the logical volume is larger than one data segment). Therefore, to remove a logical volume of data from such a library, all of the volume's segments would have to be individually transferred from the corresponding physical volumes in the RAID array to a common physical volume for subsequent removal.

In addition to the removability problem, RAID has an efficiency problem when considered for use in libraries and other environments with removable media. When performing a storage operation using RAID, it is typically not important which physical volume is being used, since RAID is not concerned with any particular allocation of files among physical volumes. Instead, RAID views all physical volumes as a single, large logical volume. This is possible because each physical volume typically includes a self-contained DASD permanently interfaced to the controller, such that storage segments of a physical volume can be easily accessed simply by specifying the appropriate addresses corresponding to that physical volume. This presents problems in removable media libraries, however, where the physical volumes are not permanently coupled to a read/write storage device; rather, a physical volume must be identified and then mounted to a storage drive before data can be read from or written to the volume. If one logical volume is striped among multiple physical volumes, sequentially mounting each physical volume to access the complete volume may require an excessive amount of time.

3

RAID managers, then, provide a number of important benefits for many different applications. When applied to library or other environments with removable media, however, RAID type storage presents a number of problems without any known solutions.

SUMMARY OF THE INVENTION

Broadly, the present invention concerns a controller that stores data in a storage subsystem such that the data of each logical volume resides together upon a single removable physical volume, such as single optical disk, multiple disk optical storage unit, single disk DASD, or multiple disk DASD. The controller includes a RAID array manager, which actually conducts data access in the storage subsystem. The RAID array manager may comprise a known RAID array manager, such as an array management software module designed to implement RAID-3. The controller also includes a volume transform filter that receives and modifies data access commands originating from a host, and provides the modified data access commands to the RAID array manager. The volume transform filter is configured to alter the operation of the RAID array manager to store data of each logical volume together on a single physical volume without striping, and to separately maintain all parity segments on a physical volume dedicated for parity storage. While the RAID array manager operates normally, the volume transform filter provides the RAID array manager with modified data access commands to effectively "trick" the RAID array manager into storing the data without striping.

In one embodiment, the invention may be implemented to provide an apparatus including multiple physical volumes and a controller including a volume transform filter and a RAID array manager. In another embodiment, the invention may be implemented to provide a method to manage data storage on the array of physical volumes, employing the array interface and RAID array manager discussed above.

The invention provides a number of distinct advantages. First, the invention's data allocation provides standalone data and parity volumes, easily removable for convenient use in data storage libraries. The invention is thus useful in environments such as Redundant Array of Independent Libraries, known as "RAIL". The invention can more efficiently access data of a given logical volume because there is no need to load and unload multiple physical volumes. The invention provides another benefit in its ease of implementation, since a significant amount of the data storage mapping workload is performed by the RAID array manager, which in some applications may comprise a pre-existing, commercially available product.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

4

DETAILED DESCRIPTION OF THE PREFERRED EMBODIMENTS

STRUCTURE

Figure 1:
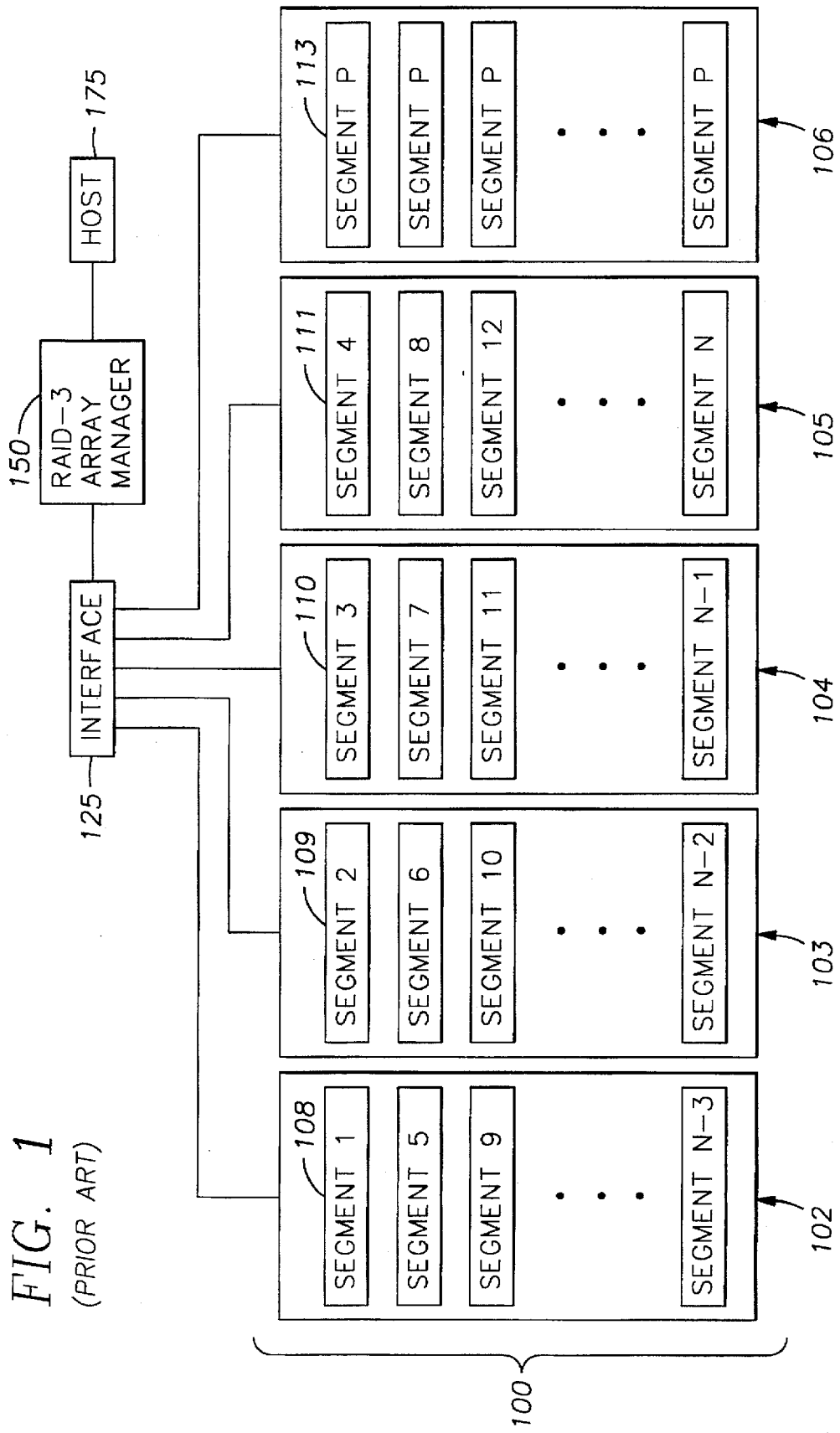
FIG. 1 is a block diagram depicting the mapping of a known RAID-3 data storage system.
Figure 2:
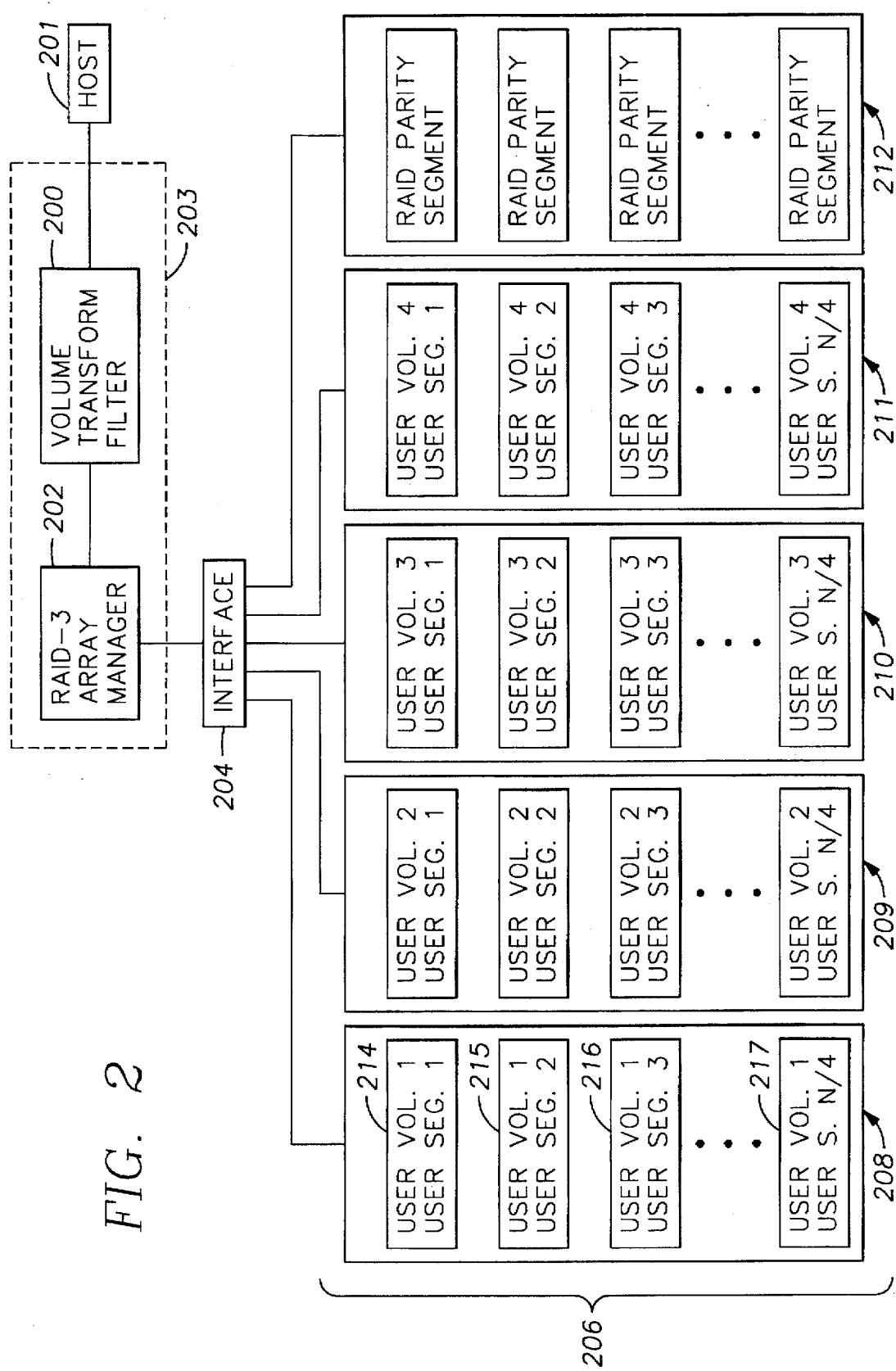
FIG. 2 is a block diagram of the hardware components and interconnections of a data storage system in accordance with the invention, also showing mapping performed pursuant to the invention.

FIG. 2 illustrates one embodiment of the hardware components and interconnections of the invention. A storage subsystem 206 includes multiple physical volumes: as an example, five physical volumes 208–212 are depicted in FIG. 2. Each of the physical volumes 208–212 preferably includes one or more storage media such as a magnetic recording disk, an optical disk, or another suitable storage medium. Each physical volume includes multiple physical storage "locations", such as the storage locations 214–217 in the case of the volume 208. Each storage location comprises an equal-sized set of contiguous bytes, which may be a small number of bytes or large number of bytes depending upon the user's requirements. If the physical volumes 208–212 comprise DASDs with one or more magnetic recording disks, each storage location may comprise a storage "track" of such a disk, for instance.

The subsystem 206 is managed by a controller 203, which communicates with the subsystem 206 via an interface 204. The controller 203 preferably comprises a model i-960 RISC microprocessor, while the interface 204 may comprise a Small Computer System Interface ("SCSI"), for example. The controller 203 includes a volume transform filter 200 and a RAID array manager 202. In the example of FIG. 2, the controller 203 may utilize a known operating system, where the array manger 202 comprises a packaged RAID-3 array manager provided by the operating system.

A host 201 originates data access commands to read or write data from/to the subsystem 206, and directs these commands to the controller 203. The host 201 may comprise, for example, a personal computer, workstation, mainframe computer, or another device or process. As discussed in greater detail below, the host 201 views the subsystem 206 as a number of logical volumes each corresponding exactly to one of the physical volumes 208–212. This view is necessary so that the host 201 can maintain the data in optimal grouping for convenient physical removal of each logical volume. Each data access command issued by the host 201 therefore includes the following elements: (1) a logical block address, including a volume number and 'storage location number within that volume, (2) the length of the data to be accessed, and (3) the operation type, such as a Read or Write operation.

In contrast to the host 201, the RAID array manager 202 addresses the subsystem 206 as a single logical volume, using a sequence of numbered logical "segments": as described above, these numbered segments continuously wind or "stripe" through the subsystem 206. Thus, the chief function of the volume transform filter 200 is to "trick"0 the RAID array manager 202 into storing data without striping, such that each logical volume exactly corresponds to a physical volume. In this way, each logical volume is conveniently separable from the subsystem 206 by removing the corresponding physical volume.

OPERATION

Figure 3:
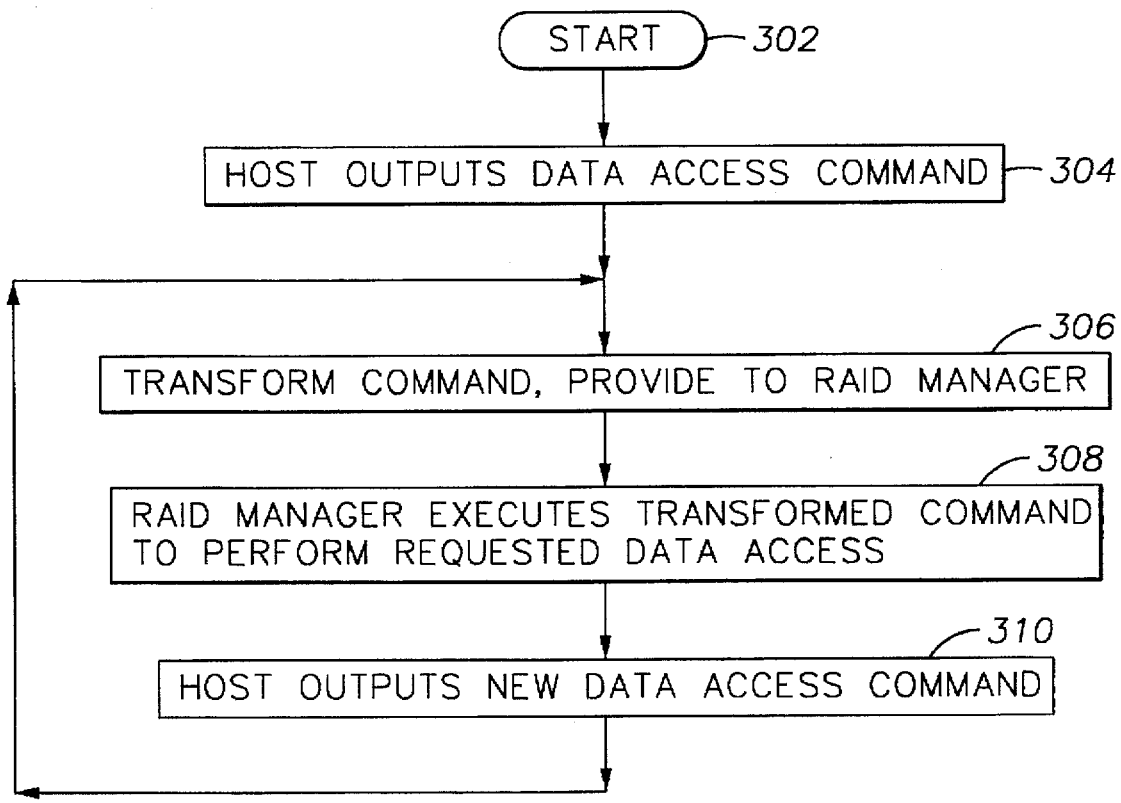
FIG. 3 is a flowchart depicting a sequence of tasks to carry out a procedure for data access and mapping in accordance with the invention.

In the example illustrated by FIG. 2, the data storage system may operate as shown in FIG. 3 by the sequence 300. After the sequence 300 begins in task 302, the host 201 in task 304 outputs a data access command that identifies a logical volume, a storage location within that volume, and the type of operation (e.g. Read or Write). Next, in task 306 the volume transform filter 200 receives the host's data access command and transforms the command to yield a logical segment number compatible with the RAID array manager 202. This transformation is performed to effectively "trick" the RAID array manager 202 into storing data without striping. The filter's transformation may be performed, for example, by implementing an intermediate mapping schedule according to Equation 1, below:

$$Useg(j,i)=i+(j-1)*(M-1) \quad [1]$$

where:
- i identifies a physical volume 208–211 specified by the host's data access command;
- j identifies an ordered storage location in the specified physical volume;
- M identifies the total number of physical volumes 208–212, including the dedicated parity volume 212; and Useg(j,i) represents the volume transform filter's output, the RAID-compatible logical segment number corresponding to segment j of user volume i.

As an example of the transformation of Equation 1, the segment 215 would have a Useg value of five, since i=1, j=2, and M=5 in the storage subsystem of FIG. 2.

After task 306, the RAID array manager 202 in task 308 performs the requested data access operation at the RAID-compatible segment identified by the volume transform filter 200. When the host outputs a new data access command (task 310), control returns to task 306 to process the data access command as discussed above.

Although the RAID array manager 202 is inherently programmed to store data with striping, the sequence 300 carefully drives the RAID manager 202 to store data with one logical volume per physical volume; this makes each physical volume fully removable. Additionally, the RAID) array manager 202 automatically calculates a parity segment based upon each perceived "stripe" of segments across all physical volumes 208–212 in the subsystem 206, without any further calculation or direction being required on the part of the host 201 or the volume transform filter 200.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A data access method for use in a storage system that includes a controller coupled to multiple physical storage volumes each physical storage volume including multiple storage locations, said controller including a RAID array manager that accesses data stored by the physical storage volumes in response to data access commands received by the RAID array manager, each said data access command associating a data block with a physical storage volume and one or more storage locations therein, said RAID array manager storing each data block by striping each data block associated with a physical storage volume across multiple physical storage volumes irrespective of association of the data block with a particular physical storage volume pursuant to a data access command, said method comprising the steps of:

receiving an original data access command associating a data block with a physical storage volume specified by the original data access command;

modifying the original data access command to create a modified data access command that, when provided to the RAID array manager, causes the RAID array manager to perform the requested data access in the specified physical storage volume without striping the data block onto any other physical storage volumes;

providing the modified data access command to the RAID array manager; and operating the RAID array manager to access the specified physical storage volume in accordance with the modified data access command.

2. The method of claim 1, the operating step comprising the steps of operating the RAID array manager to store the data block in the specified physical storage volume.

3. The method of claim 1, the operating step comprising the steps of operating the RAID array manager to read the data block from the specified physical storage volume.

4. The method of claim 2, the multiple physical storage volumes including a dedicated parity physical storage volume and the method further comprising the steps of operating the RAID array manager to calculate a parity segment based upon contents of selected storage locations from each physical storage volume, said selected storage locations including at least part of the data block, and to store the parity segment in the dedicated parity physical storage volume.

5. The method of claim 4, the stripe being made up of contents of one storage location from each physical volume.

6. The method of claim 4, the original data access command being received from a host and the calculation and storage of the parity segments being performed free from involvement of the host.

7. The method of claim 1, the modifying step comprising the steps of mathematically processing numerical indices corresponding to the identified storage location and identified physical storage volume to yield the identified storage segment number.

8. The method of claim 1, the data access command further identifying a storage location in the specified physical storage volume, the modifying step comprising the steps of solving the following equation:

$$Useg(j,i)=i+(j-1)*(M-1)$$

where:
- i=a numerical representation of the specified physical storage volume;
- j=a numerical representation of the identified storage location in the specified physical storage volume;
- M=a total count of the multiple physical storage volumes; and
- Useg(j,i)=a storage segment number, compatible with the RAID array manager and corresponding to the identified physical storage volume and storage location.

9. The method of claim 1, the physical storage volumes comprising optical disk storage devices.

10. The method of claim 1, the physical storage volumes comprising magnetic disk storage devices.

11. The method of claim 1, the physical storage volumes being physically removable from the storage system.

12. The method of claim 1, the RAID array manager indexing data contained in the storage locations by a continuously numbered sequence of storage segment numbers corresponding to a striped pattern of storage locations in the physical storage volumes, where the segment numbers are determined according to the following equation:

$$Useg(j,i)=i+(j-1)*(M-1)$$

where:

i=a numerical representation of one of the physical storage volumes;

j=a numerical representation of a storage location of the identified physical storage volume;

M=a total count of the multiple physical storage volumes; and

Useg(j,i)=a storage segment compatible with the RAID array manager and corresponding to the identified physical storage volume and storage location.

13. The method of claim 1, the RAID array manager being a RAID-3 type array manager.

14. A method for data storage, comprising the steps of:
receiving a command to exchange data with a storage system having multiple data storage media each having multiple storage locations therein, said command identifying one of the storage media and multiple storage locations therein;

in response to said received command generating a modified command, that if provided as input to a RAID array manager that stores received data according to a predefined continuous sequence of segment numbers corresponding to a striped pattern of storage locations in the storage media, would result in an exchange of data with the identified storage locations of the identified storage medium without striping of said data across multiple data storage media;

directing the modified command to the RAID array manger; and operating the RAID array manger to exchange the data with the identified storage locations of the identified storage medium in accordance with the modified command.

15. The method of claim 14, further comprising the steps of operating the RAID array manager to generate parity information and store the parity information upon a dedicated parity storage medium.

16. A data access method for use in a storage subsystem including multiple data storage volumes and at least one parity storage volumes, each said volume including a plurality of storage locations, said method comprising the steps of:
receiving a primary data access command from a host, said primary data access command including identification of one of the data storage volumes and multiple storage locations within the identified data storage volume;

in response to the primary data access command, operating a volume transform filter to generate a secondary data access command that, if provided to a RAID array manager that stores received data according to a predefined continuous sequence of segment numbers corresponding to a striped pattern of storage locations in the data storage volumes, would cause the RAID array manager to access the identified storage locations and execute the primary data access command therein without striping of said data across multiple data storage volumes;

providing the secondary data access command to the RAID array manger; and in response to the secondary data access command, operating the RAID array manger to access the identified storage locations.

17. The method of claim 16, the RAID array manager comprising a RAID-3 array manager.

18. The method of claim 16, the primary data access command comprising a Write command.

19. The method of claim 18, the steps of operating the RAID array manager comprising the steps of, in response to the secondary data access command, operating the RAID array manager perform steps comprising:
writing data to the identified storage location:

calculating parity information based upon contents of the identified storage location and contents of one selected storage location from each of the other data storage volumes: and storing the calculated parity information in the parity storage volume.

20. A data access method for use in a storage system that includes multiple data storage volumes each including multiple storage locations, the storage system also including a RAID array manager that accesses data stored by the data storage volumes in response to array access commands received by the RAID array manager, said RAID array manager storing received data in the storage locations according to a continuous numbered sequence of storage segment numbers corresponding to a pattern of the storage locations striped across the data storage volumes, where each said array access command includes an identification of a specific segment number, said method comprising the steps of:
receiving a data access command requesting exchange of data with a specified data storage volume in the storage system;

in response to receipt of the data access command, generating an array access command that, if provided as an input to the RAID array manager, would result in exchange of data with the specified storage volume pursuant to the data access command free from striping of said data across multiple physical storage volumes; and providing the array access command to the RAID array manager; and operating the RAID array manager to exchange data with the identified storage locations of the selected data storage volume pursuant to the data access command.

21. A data storage system, comprising:
multiple physical storage volumes each containing a plurality of storage locations;

an input to receive original data access commands for access of data stored in the physical storage volumes, each original data access command associating a data block with a physical storage volume; and a controller coupled to the physical storage volumes and including:
a RAID array manager storing received data by striping each data block associated with a physical storage volume across multiple physical storage volumes irrespective of association of the data block with a particular physical storage volume pursuant to a data access command; and a volume transform filter interconnected between the input and the RAID array manager to receive original data access commands from the input, and for each original data access command, to (1) generate a modified data access command that, if provided to the RAID array manager, causes the RAID array manager to exchange data with the identified physical storage volume, calculate parity information based on at least a part of the data block along with data contained in one storage location from each of the other physical storage volumes, and store the parity on a physical storage volume dedicated for storage of parity information, and (2) provide the modified data command to the RAID array manager.

22. The system of claim 21, each storage location comprising a track.

23. The system of claim 21, the physical storage volumes comprising magnetic disk storage devices.

24. The system of claim 21, the RAID array manager comprising a RAID-3 array manager.

25. In a storage system that includes multiple data storage volumes each including multiple storage locations, the storage system also including a RAID array manager that accesses data stored by the data storage volumes in response to data access commands received by the RAID array manager, said RAID array manager storing received data in the storage locations according to a continuous numbered sequence of storage segment numbers corresponding to a striped pattern of the storage locations, where each said data access command includes an identification of a specific segment number, a volume transform filter programmed to perform steps comprising:

receiving a data access command requesting exchange of data with a specified data storage volume in the storage system;

in response to receipt of the data access command, generating an array access command that, if provided as an input to the RAID array manager, would result in exchange of data with the specified storage volume pursuant to the data access command free from striping of said data across multiple physical storage volumes; and providing the array access command to the RAID array manager; and operating the RAID array manager to exchange data with the identified storage locations of the selected data storage volume pursuant to the data access command.

\* \* \* \* \*